United States Patent
Sargeant et al.

(10) Patent No.: US 6,495,284 B2
(45) Date of Patent: Dec. 17, 2002

(54) END SEAL ASSEMBLY FOR AN ALKALINE CELL

(75) Inventors: Sean A. Sargeant, Lagrange, GA (US); Richard Valentine, Roanoke, AL (US)

(73) Assignee: The Gillette Company, Boston, MA (US)

(*) Notice: Subject to any disclaimer, the term of this patent is extended or adjusted under 35 U.S.C. 154(b) by 124 days.

(21) Appl. No.: 09/781,837

(22) Filed: Feb. 12, 2001

(65) Prior Publication Data

US 2002/0110727 A1 Aug. 15, 2002

(51) Int. Cl.[7] .................................................. H01M 2/02
(52) U.S. Cl. .................... 429/174; 429/181; 429/185
(58) Field of Search ................. 429/171, 172, 429/174, 175, 181, 185

(56) References Cited

U.S. PATENT DOCUMENTS

| | | | | |
|---|---|---|---|---|
| 3,915,750 A | * | 10/1975 | Uetani et al. | 429/135 |
| 4,124,738 A | * | 11/1978 | Riedl | 429/171 |
| 4,309,493 A | * | 1/1982 | Kuhl et al. | 429/172 |
| 5,080,985 A | * | 1/1992 | Wiacek et al. | 429/172 |
| 6,025,090 A | | 2/2000 | Sargeant | |
| 6,042,967 A | | 3/2000 | Sargeant | |

* cited by examiner

*Primary Examiner*—Carol Chaney
(74) *Attorney, Agent, or Firm*—Barry D. Josephs; Paul I. Douglas; Thomas G. Krivulka

(57) ABSTRACT

An end seal assembly for small sized cylindrical alkaline cells. The seal assembly eliminates the need for a separate end cap and also eliminates the need for an insulating washer which is normally included between the end cap and housing at the cell's open end in order to insulate the end cap from the housing. The seal assembly includes an insulating sealing disk which fits into the open end of the cell housing. The peripheral edge of the cell housing is crimped over the edge of the sealing disk to seal the cell. The sealing disk comprises an integral raised central boss which protrudes from the housing open end. An elongated current collector penetrates into the cell's interior through an aperture in the central boss. The head of the current collector is thus exposed to the external environment and forms an end (negative) terminal for the cell. The boss is wider than normal in order to prevent interlocking with heads from other like cells.

38 Claims, 5 Drawing Sheets

END SEAL ASSEMBLY FOR AN ALKALINE CELL

FIELD OF THE INVENTION

The invention relates to an end terminal assembly for sealing small diameter alkaline electrochemical cells. The invention relates to insulating sealing disks which are used to seal the open end of the alkaline cell casing.

BACKGROUND

Conventional alkaline electrochemical cells are formed of a is cylindrical casing (housing) having an open end. The casing is initially formed with an enlarged open end. After the cell contents are supplied, the cell is closed by crimping the casing edge over an edge of the end cap assembly and radially compressing the housing around the assembly to provide a tight seal. The end cap assembly comprises an exposed terminal end cap plate and typically a plastic insulating member in the form of a plastic sealing disk which forms a plug at the open end of the housing and insulates the terminal end cap plate from the cell housing. A problem associated with design of alkaline cells is the tendency of the cell to produce gases as it continues to discharge beyond a certain point, normally around the point of complete exhaustion of the cell's useful capacity. Alkaline cell are conventionally provided with a rupturable diaphragm or membrane within the end cap assembly, for example, as described in U.S. Pat. No. 3,617,386. Such membranes are typically integrally embedded as a thinned out region within the sealing disk are designed to rupture when gas pressure within the cell exceeds a predetermined level. The rupturable vent membrane may be integrally formed as part of the plastic insulating member included within the end cap assembly. Such vent membrane may typically be of circular shape as shown in U.S. Pat. No. 4,537,841. As shown in this latter reference the rupturable membrane can be integrally formed as a thin portion of the plastic insulating member. The rupturable membrane may also take the form of a grooved or circumferential configuration as disclosed in U.S. Pat. No. 5,080,985. The end cap assembly can also be provided with vent holes for the gas to escape when the diaphragm or membrane is ruptured.

There is typically an annular cavity or void space carved out of the sealing disk immediately over the rupturable membrane. Such cavity or void space allows gas to accumulate within the cell and provides a path for gas to escape from the cell. Such annular cavity can typically have a width which comprises a substantial portion of the sealing disk radius, for example, at least about 50% of the sealing disk radius.

In one conventional (stacked) end cap assembly for small diameter alkaline cells the open end of the cylindrical casing is sealed by inserting the sealing disk into the open end and crimping the peripheral edge of the casing over the edge of the sealing disk. A paper or plastic washer can the be inserted in stacked arrangement over the crimped edge of the casing and the end cap is inserted over the paper washer. In such stacked arrangement the washer insulates the end cap (negative) from the casing (positive). The end cap can be welded to an elongated current collector which penetrates through the sealing disk and into the cell's anode material. A representative stacked end cap assembly for small diameter cells having a paper washer between the end cap and casing edge is shown in U.S. Pat. No. 6,025,000. In U.S. Pat. No. 6,025,000 it will be observed that there is a large annular cavity (79) immediately above rupturable membrane (152) within sealing disk 150. The annular cavity (79) as shown in this reference has a width which comprises at least about 50% of sealing disk radius.

In order to provide a tight seal alkaline cells have end cap assemblies which include a metal support disk inserted in a cavity within the plastic insulating member. The metal support disk may have a convoluted surface as shown in U.S. Pat. Nos. 5,532,081 or 5,080,985 which assures that end cap assembly can withstand high radial compressive forces during crimping of the cell's housing around the end cap assembly. Such support disk allows high radial forces to be applied during crimping. This results in a tight mechanical seal around the end cap assembly at all times. To provide additional support during crimping the peripheral edge of the terminal end cap may also be located in a cavity within the plastic insulating member as shown in U.S. Pat. No. 5,080,985. Such designs, however, can occupy additional space within the cell and can markedly increase the complexity of fabrication, particularly if applied to very small cells.

As disclosed in U.S. Pat. No. 6,025,090 the end cap assembly for small diameter alkaline cells, e.g. AAAA (Quad A) or AAA size cells can be designed without a metal support disk therein. The end cap assembly shown in U.S. Pat. No. 6,025,090, however, includes a paper washer (130) between the casing edge and end cap (200) at the cell's open end. It would is desirable to provide the alkaline cell with an end terminal assembly without the paper washer. However, when the paper washer is removed there is the problem of insulating the end cap (200) from the casing. If the end cap (200) is also eliminated from the stacked design presented in U.S. Pat. No. 6,025,000, there would be difficulties encountered during mass production of the small size cells. Specifically, when the cells are intermingled during storage or aligned on a conveyer belt, there is a chance that the head of one cell will interlock into the enlarged annular cavity (79) within the sealing disk of another cell.

Thus, it is desirable to provide a seal for small diameter alkaline cells which eliminates the need for a separate end cap and also eliminates the need for a paper (or plastic) washer between the casing edge and the negative terminal.

It is desirable to provide an end terminal assembly for small diameter alkaline cells wherein the end cap assembly does not include a metal support member and also does not require a paper washer between the casing edge and the negative terminal.

BRIEF DESCRIPTION OF THE DRAWINGS

The invention is more fully described with reference to the drawings in which.

SUMMARY OF THE INVENTION

Figure 1:
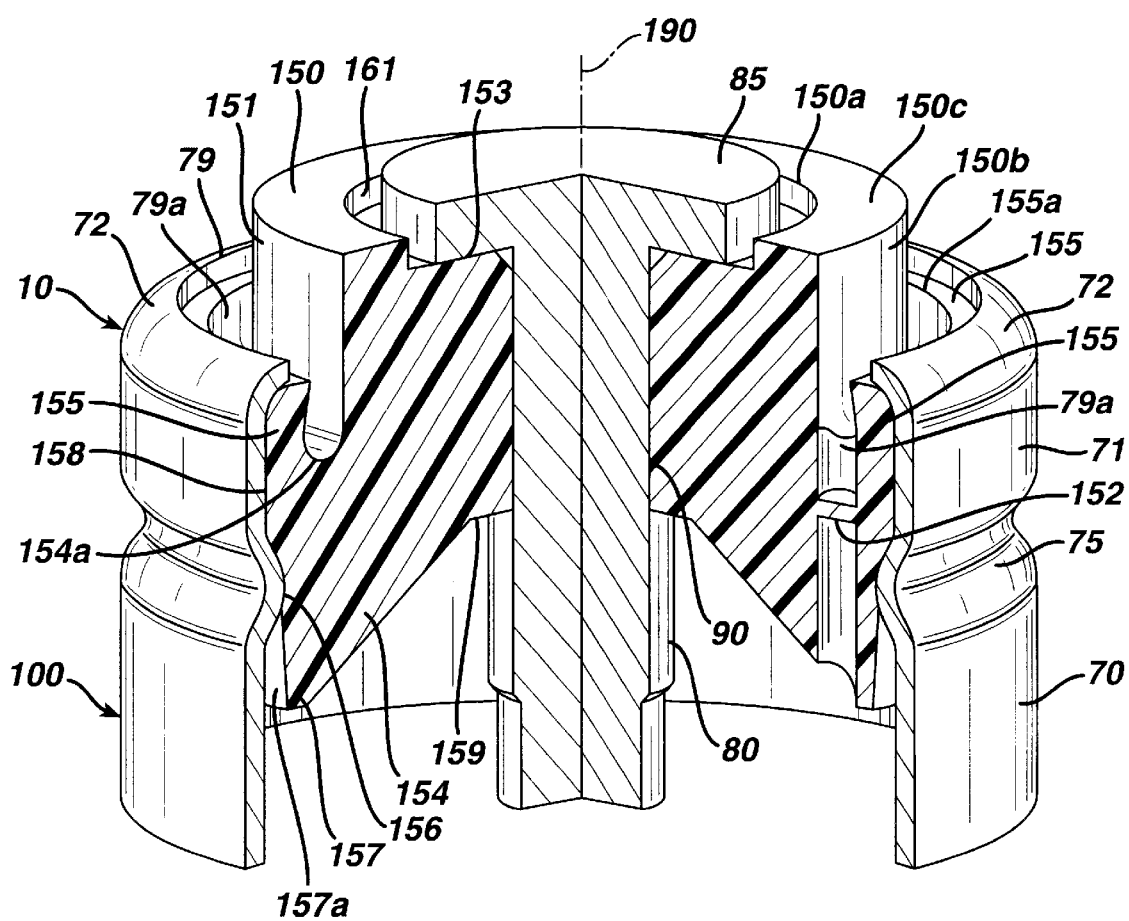
FIG. 1 is a cross sectional view of a specific embodiment of the end terminal assembly of the invention to seal the open end of a small diameter alkaline cell.
Figure 2:
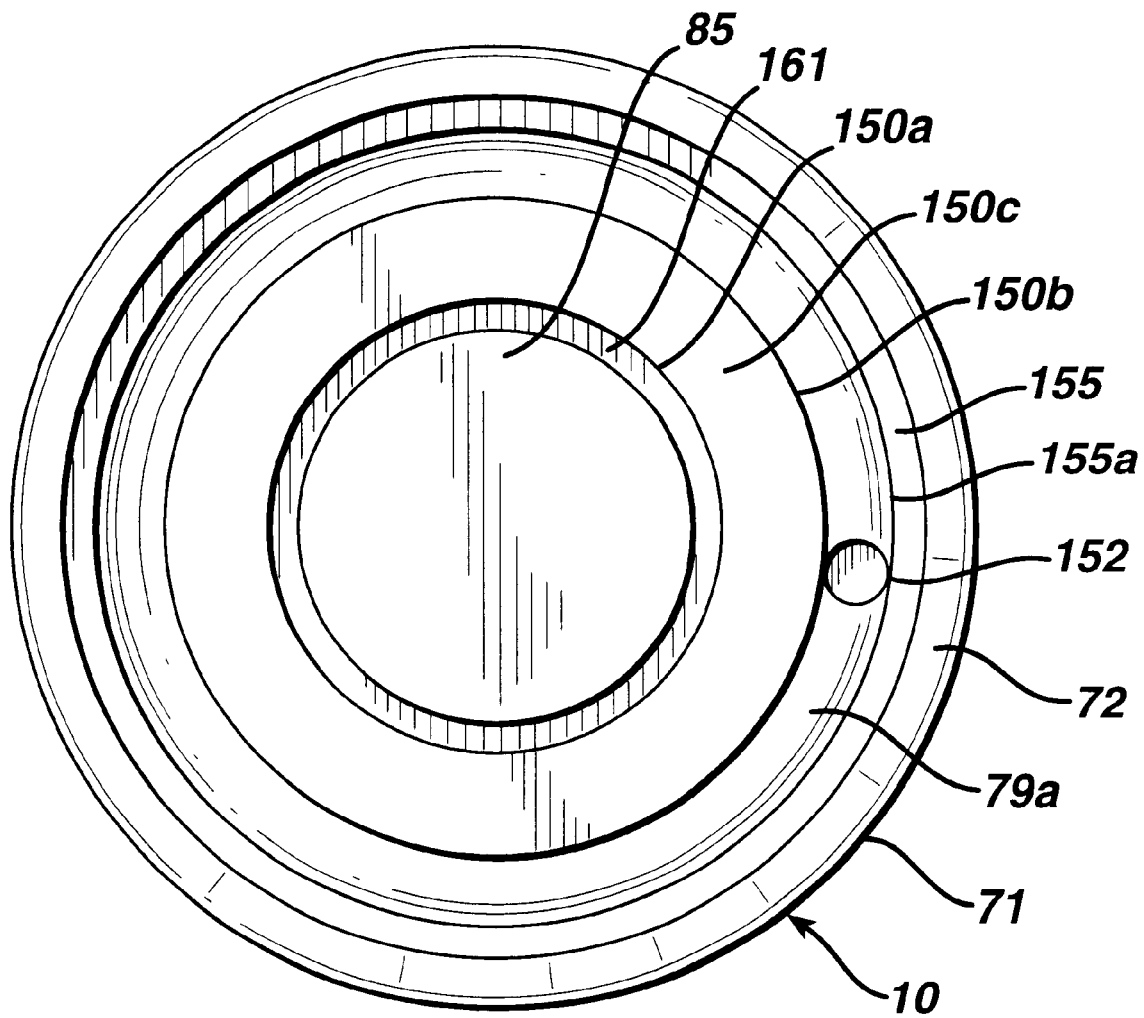
FIG. 2 is a top plan view of the end terminal assembly shown in FIG. 1.

The invention is directed to an end seal assembly for small diameter alkaline cells. The cells typically have an anode comprising zinc and a cathode comprising manganese dioxide. The cells have a diameter of less than 10 mm, preferably between 7 and 9 mm. The seal assembly of the invention is particularly applicable to AAAA size and AAA size alkaline cells.

The seal assembly of the invention is employed to seal the open end of the small diameter cylindrical alkaline cell. The seal assembly includes a insulating sealing disk which fits into the open end of the cell housing (casing) after the cell has been filled with active materials. The peripheral edge of the cell housing is crimped over the edge of the sealing disk. The sealing disk comprising an integral raised central boss. A portion of said boss protrudes from the housing open end. An elongated current collector penetrates into the cell interior (anode) through an aperture in the central boss. The head of the current collector becomes seated in a pocket or recessed space located within the top surface of the boss. The head of the current collector is thus exposed to the external environment and serves as the negative terminal for the cell.

The seal assembly of the invention eliminates the need for separate end cap which is normally placed over the sealing disk and welded to the current collector. The seal assembly of the invention also eliminates the need for a separate insulating washer (paper or plastic washer) which is normally placed between the sealing disk and the end cap in order to insulate the end cap from the cell housing. The raised central boss is wider than that conventionally employed in insulating seals for small diameter cells. The integral raised central boss protruding from the insulating seal disk of the invention has a width which is at least about 60% the diameter of the cell housing. The raised central boss preferably has a diameter between about 60 and 90%, more preferably between about 70 and 90% of the diameter of the cell housing. There is an annular depression or cavity in the top surface of the sealing disk between the boss outer surface and sealing disk peripheral edge. The cavity is exposed to the external environment. When gas pressure within the cell builds up to a predetermined level an underlying membrane ruptures releasing gas into the cavity from which it escapes to the environment. The wider cental boss reduces the width of the cavity. The reduced cavity width prevents the end terminal head (negative terminal) from other like cells from interlocking therein when the cells are intermingled during storage or when passed on a conveyer belt during cell assembly.

DETAILED DESCRIPTION

The end seal assembly 10 of the invention (FIGS. 1–4) is suitable for application to small diameter cylindrical alkaline cells. The invention is principally applicable to small diameter alkaline cells. The term "small diameter" alkaline cells as used herein is intended to mean alkaline cells having a diameter less than about 10 mm, preferably between about 7 and 10 mm. Such small diameter alkaline cells typically also have a length between about 41 mm and 45 mm.

The end terminal seal assembly of the invention is principally applicable to cylindrical alkaline cells having a diameter of an AAAA (LR61), or AAA size cell and any diameter therebetween. Thus, the invention is directed principally to small size alkaline cells having a housing diameter including the diameter of AAA size cells and smaller sizes, that is, less than about 10 millimeters. Desirably such small size alkaline cells having a housing outside diameter between about 7 and 10 millimeters, preferably between about 7 and 9 mm. (This is not to say that the invention could not be applied as well to larger size cells, depending upon the strength of the plastic and/or the expected internal pressure.) The AAA cell specifically has a diameter of about 9 mm and a housing length of about 42 mm. The end seal assembly 10 of the invention is particularly suitable for application to cylindrical AAAA (Quad A) size alkaline cells. Such cells can have a housing outside diameter typically between about 7.7 and 8.3 millimeters and length of between about 41.5 and 42.5 millimeters. (The AAAA cell is cross referenced by American National Standards Institute (ANSI) as "25A" cell and in Europe by the International Electrotechnical Commission (IEC) designation "LR61" cell.) Six of such AAAA size (LR61) cells can be conveniently aligned in parallel and connected in series to form the standard size 9-Volt alkaline battery commonly used in portable radios, portable audio players, television and compact disc remote controllers, toys and other small electronic appliances. Such standard 9-volt battery has a rectangular parallelepiped housing of dimensions 4½ cm length, 2½ cm width, and 1½ cm thickness which conforms to the standard for such 9-volt alkaline batteries set by the American National Standards Institute (ANSI) or in Europe by the International Electrotechnical Commission.

A specific embodiment of the end terminal seal assembly 10 of the invention preferred for the small diameter alkaline cell 100 is shown in FIGS. 1–4. The alkaline cell 100 (FIGS. 1–4) is preferably an AAAA size (LR61) cylindrical cell comprising a cylindrical housing 70 of length of between about 41.5 and 42.5 millimeters and outside diameter of between about 7.7 and 8.3 millimeters. The housing 70 wall thickness may be between about 0.1 mm and 0.25 mm. The cell 100 can employ alkaline cell anode, cathode, and electrolyte chemistries and separator material conventionally employed in larger cells, for example, AA or C and D cells. Thus, cell 100 (FIG. 4) can have an anode 20 comprising zinc, a cathode 30 comprising compacted manganese dioxide, and an electrolyte within the anode comprising an aqueous solution of potassium hydroxide. Additives may be employed, as conventional, to modify the cell chemistry. The alkaline cell can employ an ion porous separator material 40, typically comprising rayon or cellulose. The end terminal assembly 10 of the invention is not intended to be restricted to any particular alkaline cell chemistry. The end terminal assembly 10 of the invention in one preferred embodiment is intended for application to alkaline cells employing conventional alkaline cell chemistries and modifications thereof. Such representative chemistries, for example, is disclosed in U.S. Pat. No. 5,401,590, herein incorporated by reference.

The end terminal assembly shown in FIGS. 1–4 comprises an insulating sealing disk 150, and an elongated current collector 80. Insulating disk 150 has a thick central section which forms raised boss 151 which has a central aperture 90 therethrough. Central aperture 90 is provided for insertion therein of metallic current collector 80. Central raised boss 151 is of cylindrical shape. The raised boss 151 is bounded by an outer surface 150b. Boss 151 has a recessed centrally located exposed pocket 161 within the boss top surface. Pocket 161 is typically of circular shape. Pocket 161 has a diameter less than the outside diameter of boss 151 so that the pocket lies within the outer bounds of boss 151. Pocket 161 has a depth of between about 0.2 mm and 0.3 mm, which is enough to accommodate head 85 of current collector 80. However, the depth of pocket 161 is preferably less that the thickness of current collector head 85. An anode current collector 80 is inserted into central aperture 90 within the sealing disk 150 until the head 85 of the current collector is seated within recessed pocket 161. The depth of recessed pocket 161 is preferably less than the thickness of head 85 so that a portion of head 85 extends above the topmost surface 150c of raised boss 151 as shown in FIG. 1. The topmost surface 150c of raised central boss 151 extends a distance of about 0.6 mm from the peripheral edge 72 of the casing. The raised central boss 151 is characterized in that it has a width which is at least about 60% the diameter of casing 70. Preferably, the diameter of boss 150 is between about 60% and 90%, preferably between about 70% and 90% the inside diameter of casing 70. More preferably the diameter of boss 150 is between about 75% and 90% the inside diameter of casing 70. The outer surface 150b of boss 151 extends downwardly to form convex curved floor 154a, curved floor 154a then curves upwards forming surface 155a for a portion of the distance of the boss height. The surfaces 150b, 154a, and 155a, thereby define the bounds of trough or cavity 79a as shown in FIG. 1. Thus, cavity 79a is bounded by an outer surface 155a and an inner surface 150b and the curved convex floor surface 154a. Surface 155a also forms the inside surface of peripheral edge 155 of sealing disk 150. Peripheral edge 155 as shown best in FIG. 1 defines the outer edge of sealing disk 150. A rupturable membrane 152 which can be in the form of a thinned out portion of the sealing disk is preferably located immediately under cavity 79a. Thus, when gas builds up within the cell to a predetermined level, the membrane 152 ruptures releasing gas into cavity 79a. The released gas escapes directly from cavity 79a into the surrounding environment.

Figure 3:
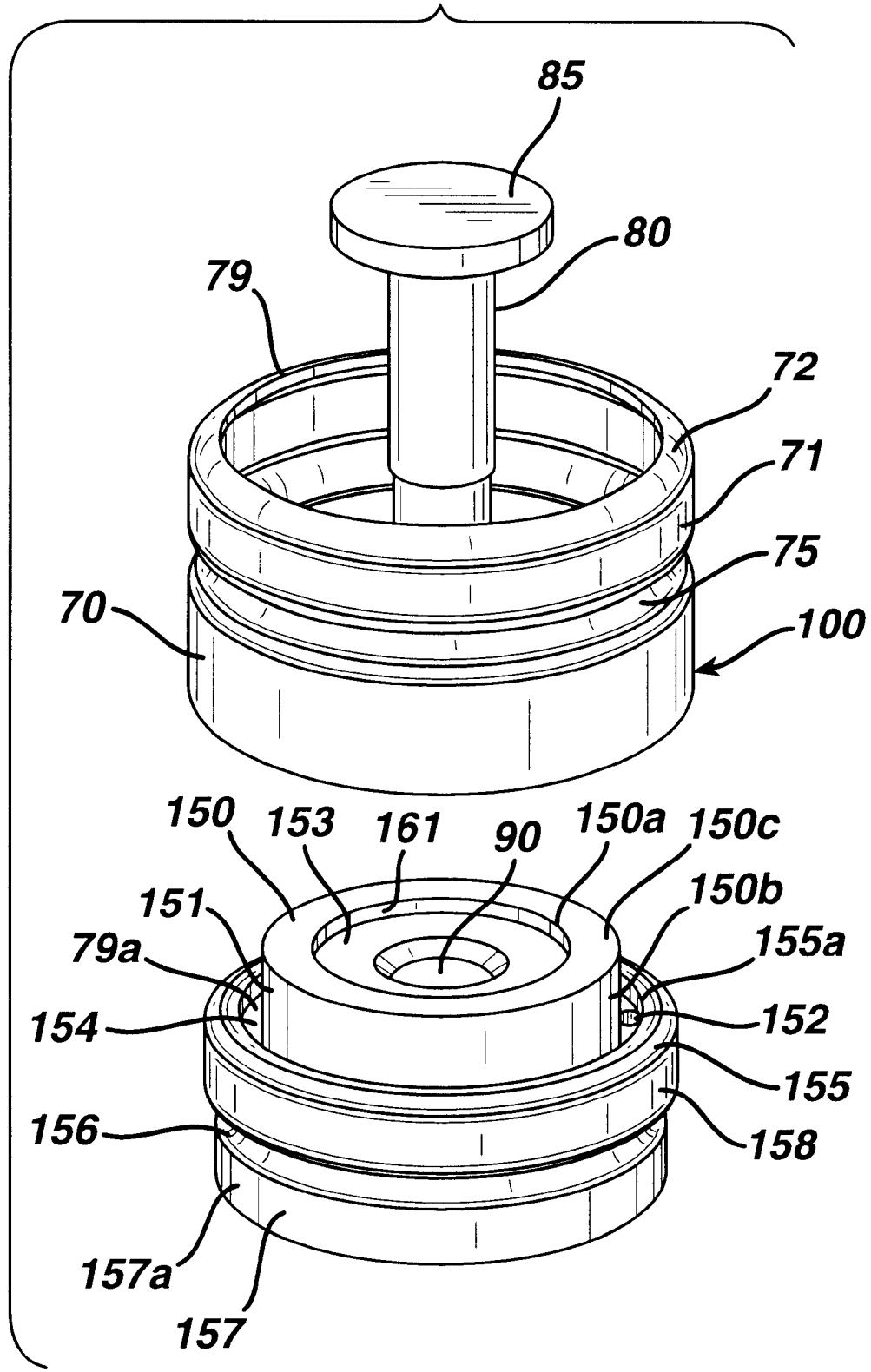
FIG. 3 is an exploded view of the end terminal assembly shown in FIG. 1.
Figure 4:
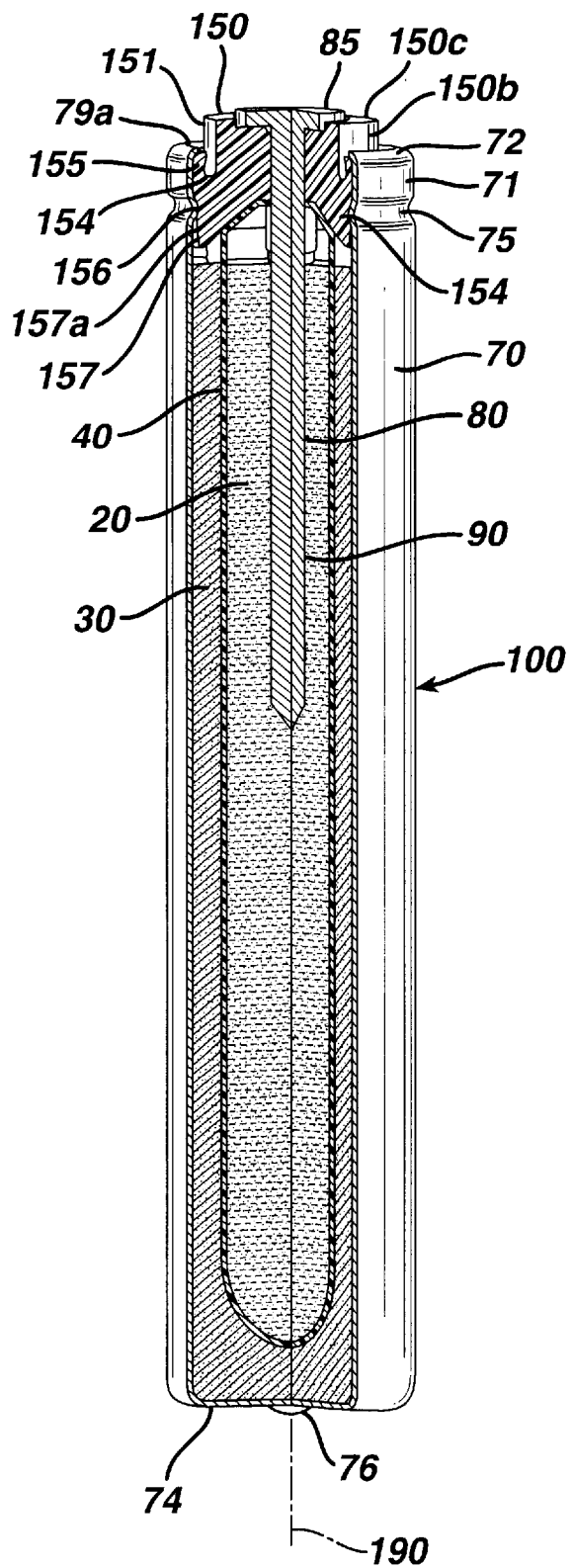
FIG. 4 is a small diameter alkaline cell with the end cap assembly shown in FIG. 1 inserted therein.
Figure 5:
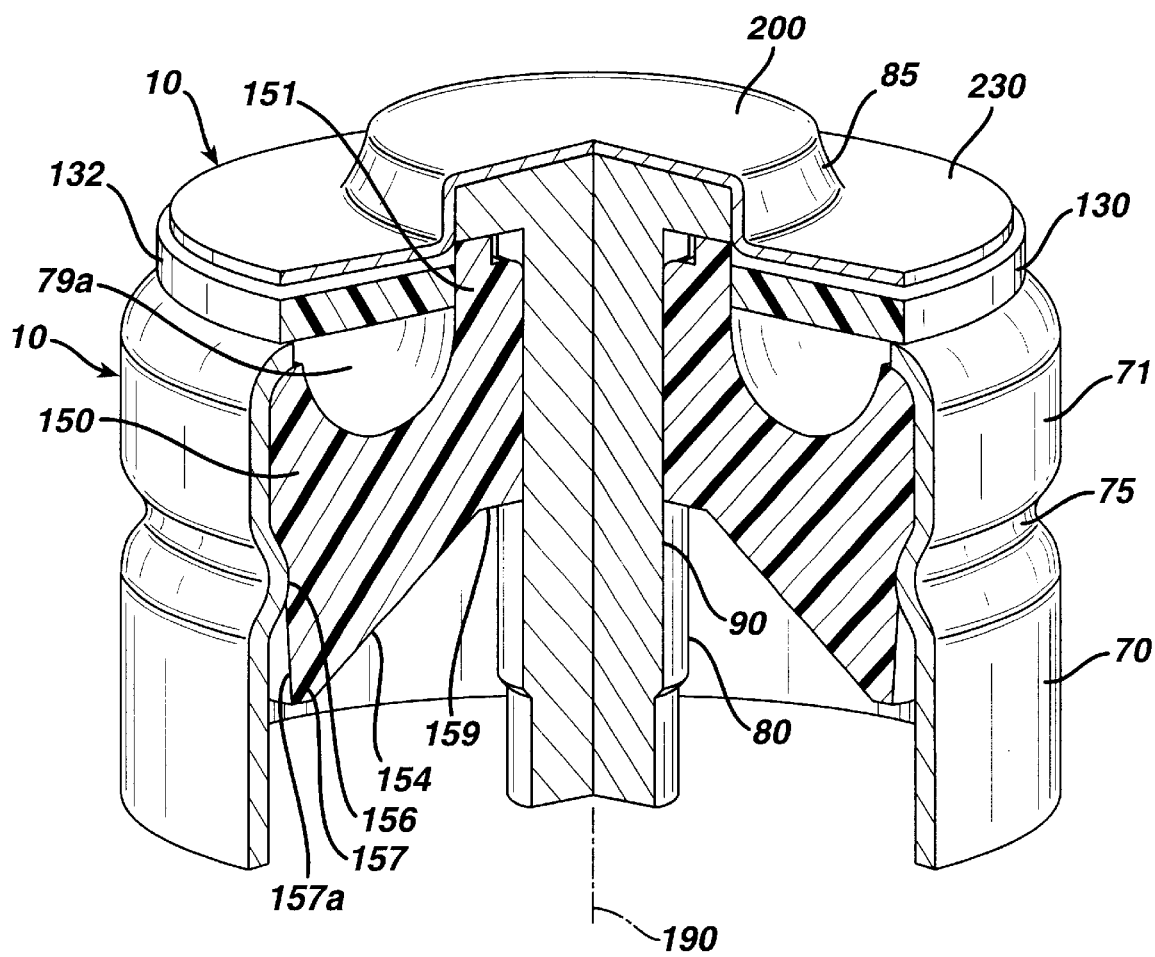
FIG. 5 is a cross sectional view of a prior art end cap assembly for small diameter alkaline cells.

The sealing disk 150 of the invention is characterized by having a wider raised boss 151 than is conventional, that is, a boss having a diameter which is preferably between about 60% and 90%, preferably between about 70% and 90% the diameter of casing 70. This results in a narrower cavity 79a between the boss outer surface 150b and the inside surface 155a of peripheral edge 155. Thus cavity 79a has a width between about 10 and 40%, preferably between about 10 and 30% of the radius of casing 70. The narrow width of cavity 79a assures that protruding heads, e.g. protruding current collector heads 85 from other like cells, will not interlock into cavity 79a of another cell when the cells are intermingled during storage or conveyed by automated conveyer systems. The end terminal assembly 10 of the invention is further characterized in that the head 85 of current collector 80 is exposed from the completed cell 100 and forms the negative terminal of the cell (FIGS. 1 and 4). Thus, the end terminal assembly 10 of the invention having the wider raised boss 150 eliminates the need of a separate terminal end cap and also eliminates the need for a paper washer between the terminal and casing edge at the cell's open end. Such conventional washer (washer 130) and separate terminal end cap (end cap 200) which are normally included in end cap assemblies for small diameter alkaline cells is illustrated in the prior art FIG. 5 for comparison. The prior art end cap assembly 10 for small diameter alkaline cells is shown herein in FIG. 5. Such prior art end cap assembly as applied to small diameter cells is described in detail in U.S. Pat. No. 6,025,090. Insulating washer 130 shown in prior art FIG. 5 provides electrical insulation between end cap 200 and the peripheral edge 72 of cell housing 70. Thus, the end terminal assembly 10 of the present invention (FIGS. 1–4) as applied to small diameter alkaline cells results in the elimination of two prior art components a) a separate terminal end cap and b) the paper (or plastic washer) normally inserted between the terminal end cap and cell casing.

In alkaline cell 100 any portion of the housing 70 can form the positive terminal. Preferably, the positive terminal is pip (surface protrusion) 76 located at the closed end 74 of housing 70 (FIG. 4). Insulating disk 150 has a midsection region 154 located between boss 151 and peripheral edge 155 and immediately under cavity 79a. Both cavity 79a and midsection 154 is much narrower than is conventionally employed in designing sealing disks for small diameter alkaline cells. As shown in FIG. 1 a circumferential leg 157 extends downwardly from peripheral edge 155 and forms a circumferential skirt 157a below circumferential indent 75 and around the bottom of the insulating disk 150. Leg 157 extends towards the cell interior to a level below the plane of the bottom surface 159 of boss 151. Leg 157 does not contact cell housing 70 and preferably does not form a snap fit around circumferential indent 75 thereby permitting easy insertion of the peripheral edge 155 of disk 150 onto circumferential indent 75 during cell assembly. That is, only small amount of force is needed to insert peripheral edge 155 of disk 150 onto circumferential indent 75, since it is preferably not snap fitted around indent 75. (Snap fit occurs if the maximum outside diameter of the circumferential skirt 157a below circumferential indent 75 is greater than the cell inside diameter in the plane of said circumferential indent 75. The present invention is also applicable to insulating disks 150 having a skirt 157a with such snap fit.) Conversely, snap fit within the housing does not occur if the maximum outside diameter of the circumferential skirt 157a below said circumferential indent 75 is less than the cell inside diameter in the plane of said indent 75, as in the embodiment illustrated in FIGS. 1 and 4.) Leg 157 provides additional structural support to insulating disk 150 and allows greater radial forces to be applied to insulating disk 150 during crimping of the top portion 71 of the cell housing around said sealing disk. Midsection 154 has at least one integral thinned portion 152 which forms a rupturable membrane, oriented preferably perpendicular to the cell's longitudinal axis 190. Rupturable membrane 152 preferably is vertically aligned with cavity 79a and lies immediately under cavity 79a. Rupturable membrane 152 desirably can be in the configuration of a circular island as shown best in FIG. 2. Rupturable membrane 152 may be of other shape, for example, oval, rectangular, or polygonal. Alternatively, rupturable membrane 152 may be in the form of straight or curved grooves forming a thin rupturable region within a portion of insulating disk 150. Rupturable membrane 152 is advantageously formed during the molding of insulating disk 150, preferably by injection molding.

The end terminal assembly 10 (FIG. 1) is assembled from the individual components (FIG. 3) by first inserting the plastic insulating disk 150 into the open end 79 of a cylindrical housing 70. Housing 70 has a circumferential indent in its surface forming circumferential bead 75 near the open end 79. The insulating disk 150 has a circumferential groove 156 around the outside surface of its peripheral edge 155 (FIG. 3). Insulating disk 150 is inserted so that groove 156 rests on circumferential bead 75 which forms a seat for insulating disk 150. Housing 70 is initially formed so that it has an enlarged portion 71 at the open end 79. That is, the diameter of housing 70 at open end 79 is initially larger than the diameter of the rest of the housing. The enlarged portion 71 of housing 70 is radially compressed around the peripheral edge 155 of insulating disk 150 until the inside surface of housing portion 71 presses very firmly against the outside surface 158 of peripheral edge 155. The peripheral edge 72 of cell housing 70 is then crimped over the peripheral edge 155 of insulating disk 150. Current collector 80 is then inserted downwardly through aperture 90 within boss 151. Boss 151 may initially be provided with a thin wall at the base of aperture 90 such that aperture 90 does not initially run completely through boss 151. In such case the thin wall is punctured as the current collector is forced through aperture 90, thereby providing a friction fit between current collector 80 and the wall defining aperture 90. Aperture 90 may also initially be of slightly smaller diameter than the diameter of current collector 80. This enhances the friction fit between the current collector 80 and the wall defining aperture 90. The current collector 80 is pushed through aperture 90 until head 85 of the current collector comes to rest against the top surface 153 of boss 151 so that it becomes seated within circular pocket 161.

Insulating disk 150 and integral rupturable membrane 152 may be composed of a durable, corrosion resistant plastic. Insulating disk 150 and integral rupturable membrane 152 is desirably composed of a polyamide (nylon), preferably nylon 66 or nylon 612, more preferably nylon 612. Alternatively, insulating disk 150 and membrane 152 may be composed of polypropylene, talc filled polypropylene, sulfonated polyethylene or other polyamide (nylon) grades. However, nylon 66 or nylon 612 have been determined to be more desirable materials for insulating disk 150 and membrane 152 in an AAAA alkaline cell 100. These materials are more desirable because they are durable, but yet softer than filled polymer such as talc filled polypropylene. Nylon 66 or nylon 612 also exhibits less creep than unfilled or filled polypropylene at all temperatures to which the cell may be exposed during normal operation. The insulating disk 150 formed of the softer material, namely, nylon 66 or nylon 612 allows peripheral edge 72 of housing 70 to be crimped over peripheral edge 155 of disk 150 with generally less force than would be required if filled polymeric material such as talc filled polypropylene were employed. This has been determined to result in easier and more reliable sealing of the very small diameter AAAA cell 100. Nylon 612 is the more preferred material for insulating disk 150 because it absorbs moisture better and is more chemically resistant and more resistant to cracking. Insulating disk 150 has a diameter corresponding to the inside diameter of cell housing 70. For cells less than AAA size, the diameter of insulating disk 150 is less than 10 mm, typically between about 7 and 9 mm. Specifically, for AAAA size cells the diameter of insulating disk 150 is between about 7.6 and 8.2 mm and its overall thickness is between about 3 and 5 mm, preferably about 4 mm.

Housing 70 may preferably be nickel plated steel. Current collector 80 can be selected from a variety of known electrically conductive metals found to be useful as current collector materials, for example, brass, tin plated brass, bronze, copper or indium plated brass. To enhance the seal between insulating disk 150 and housing 70, a conventional water resistant sealing paste such as an asphalt based sealant, e.g., comprising bitumen and a suitable aromatic solvent, e.g. toluene. The sealing paste may be applied to the outer wall of peripheral edge 155 of insulating disk 150 or to the inside surface of housing 70 before the insulating disk 150 is inserted into the open end of housing 70. The same sealant may also be applied to the wall forming aperture 90 or to the outside surface of current collector 80 before the current collector 80 is inserted into aperture 90.

In the above described embodiment it has been determined that if the insulating disk 150 is formed of nylon 66 or nylon 612, the diameter of a circular rupturable membrane 152 may desirably be between about 1 and 2 millimeters and its thickness may be between about 0.03 and 0.2 millimeters. Such range allows membrane 152 to rupture when the cell internal gas pressure reaches a level between about 500 and 2000 psig ($3.45 \times 10^{+6}$ and $13.8 \times 10^{+6}$ pascal gage). (The pressure at which rupture occurs increases as membrane thickness is increased and decreases as membrane diameter is increased.) In a preferred embodiment membrane 152 is of circular configuration (FIG. 2) having a thickness of about 0.08 mm and diameter of about 1.5 mm. In such design membrane 152 will rupture when the small diameter cell internal pressure reaches about 1100 psig ($7.6 \times 10^{+6}$ pascal). It is believed that a single rupturable membrane 152 within insulating disk 150 is sufficient to effect rupture at the desired level of internal pressure. However, it should be appreciated that insulating disk 150 may be provided with a plurality of isolated rupturable membranes as an added safety feature to assure that rupture occurs at the desired level of cell pressure.

Comparison of the Present Invention Assembly (FIGS. 1–4) with Prior Art Assembly (FIG. 5)

A prior art end cap assembly for small diameter alkaline is shown in FIG. 5 and discussed in more detail in U.S. Pat. No. 6,025,090. Such prior art end cap assembly is given herein to better illustrate the features of the present end terminal assembly 10 of the invention (FIGS. 1–4) which represent an improvement over such prior art assembly. In the prior art assembly 10 shown in FIG. 5 there is a separate end cap 200 with underlying insulating washer 130 which lies between the cell housing peripheral edge 72 and end cap 200. The head 85 of current collector 80 shown in prior art FIG. 5 can be welded to the bottom surface of the flat central portion 205 of end cap 200. When gas pressure within the cell reaches a predetermined level, an integral membrane within seal 150 ruptures allowing gas to escape to the environment. Insulating washer 130 is typically of a plastic coated paper, e.g. polyethylene coated paper or cardboard. End cap 200 (FIG. 5) is constructed of a conductive metal having good mechanical strength and corrosion resistance such as nickel plated cold rolled steel or stainless steel. The prior art terminal end cap 200 is typically "hat shaped" conductive metal having a flat central portion 205 from which extends a downwardly stepped flat annular edge 230 as shown in prior art FIG. 5. As above discussed the end terminal assembly 10 of the present invention as shown in FIGS. 1–4 herein eliminates the need for a separate end cap 200 and also eliminates the need for a separate insulating washer 130. The end terminal assembly 10 of the present invention (FIGS. 1–4) also represents an improvement in that the raised boss 151 of the present invention is wider resulting in a narrower midsection cavity 79a (FIG. 1) than that shown in the prior art embodiment (FIG. 5). This prevents the head 85 of one cell from interlocking with the head of another cell during intermingling of the cells during storage or when aligned on a conveyer belt.

Although the present invention has been described with respect to specific embodiments, it should be appreciated that variations are possible within the concept of the invention. Accordingly, the invention is not intended to be limited to the specific embodiments described herein but will be defined by the claims and equivalents thereof.

What is claimed is:

1. In an alkaline electrochemical cell, said cell having an open ended cylindrical cell housing and an end seal assembly inserted therein closing said housing, said cell having a positive and a negative terminal, said end seal assembly comprising an electrically insulating sealing disk having a rupturable membrane therein, said insulating sealing disk having an elongated electrically conductive current collector passing therethrough, said insulating sealing disk sealing the open end of said housing and providing electrical insulation between said current collector and said housing, and the edge of said housing being crimped over the peripheral edge of said insulating sealing disk to form a cell shoulder along the line of crimp, the improvement comprising:

the end seal assembly comprising an insulating sealing disk comprising an integral central boss, wherein a portion of said boss protrudes from the housing open end, an elongated current collector penetrating through said boss, wherein a portion of said current collector protrudes from said boss and forms said negative terminal, wherein at least a portion of said insulating sealing disk lies within said cell housing, wherein the raised central boss has a width which is at least about 60% the diameter of the cell housing.

2. The electrochemical cell of claim 1 wherein said boss has a diameter between about 60% and 90% of the diameter of the cell housing.

3. The electrochemical cell of claim 1 wherein said boss has a diameter between about 70% and 90% the inside diameter of the cell housing.

4. The electrochemical cell of claim 1 wherein the boss is cylindrical and has a top surface facing the cell's external environment.

5. The electrochemical cell of claim 4 wherein said boss has a recessed pocket within its top surface, wherein said current collector has an elongated body and flanged head at one end thereof, wherein said head is seated within said recessed pocket and said elongated body protrudes into the cell interior.

6. The electrochemical cell of claim 2 wherein said cylindrical cell housing is an AAAA (LR61) size and wherein said end seal assembly does not include a metal disk within any portion of said cell housing at the open end thereof.

7. The electrochemical cell of claim 2 wherein said sealing disk has a midsection region extending radially from said boss, and a peripheral edge having an outer surface abutting the inside surface of said housing at the open end thereof.

8. The electrochemical cell of claim 7 wherein said midsection has a top surface facing the cell's external environment and a bottom surface facing the cell interior.

9. The electrochemical cell of claim 8 wherein said midsection has a cavity in its top surface, said cavity located between the outside surface of said boss and said peripheral edge.

10. The electrochemical cell of claim 9 wherein said cavity forms an annulus.

11. The electrochemical cell of claim 9 wherein the width of said cavity comprises between about 10 and 40% the diameter of said cell housing.

12. The electrochemical cell of claim 7 wherein said insulating sealing disk comprises an integral rupturable membrane portion located within said midsection region, wherein said membrane ruptures when gas pressure within the cell exceeds a predetermined level.

13. The electrochemical cell of claim 12 wherein said rupturable membrane portion forms an island within a portion of said midsection.

14. The electrochemical cell of claim 13 wherein said rupturable membrane has a circular or oval configuration.

15. The electrochemical cell of claim 13 wherein said rupturable membrane has a polygonal configuration.

16. The electrochemical cell of claim 7 wherein said end seal assembly further comprises a sealant material comprising bitumen material between the peripheral edge of said insulating sealing disk and said housing.

17. The electrochemical cell of claim 7 wherein said housing has a circumferential indent in its surface and a portion of the peripheral edge of said insulating disk rests on said indent.

18. The electrochemical cell of claim 7 wherein a portion of the housing at the open end thereof is radially compressed against the peripheral edge of said insulating sealing disk.

19. The electrochemical cell of claim 2 wherein the head of said current collector protruding from said boss forms said negative terminal of the cell.

20. The electrochemical cell of claim 2 wherein said cell does not include an end cap in electrical communication with said current collector.

21. The electrochemical cell of claim 2 wherein said cell does not include an insulating washer seated over said crimped edge of the cell housing.

22. The electrochemical cell of claim 2 wherein said insulating sealing disk comprises nylon 66.

23. The electrochemical cell of claim 2 wherein the insulating sealing disk comprises nylon 612.

24. The electrochemical cell of claim 6 wherein said AAAA (LR61) cell housing has an outside diameter of between about 7.7 and 8.3 millimeters.

25. The electrochemical cell of claim 6 wherein the insulating sealing disk has an overall thickness of between about 3 and 5 mm and a diameter of between about 7.6 and 8.2 mm.

26. The electrochemical cell of claim 12 wherein the rupturable membrane within said insulating sealing disk has a thickness of between about 0.03 and 0.2 mm.

27. In a small diameter alkaline electrochemical cell having a diameter between 7 and 10 mm, said cell having an open ended cylindrical housing and an end seal assembly inserted therein closing said housing, said cell having a positive and a negative terminal, and an electrically insulating sealing disk having a rupturable membrane therein, said insulating sealing disk having an elongated electrically conductive current collector passing therethrough, said insulating sealing disk sealing the open end of said housing and providing electrical insulation between said current collector and said housing, and the edge of said housing being crimped over the peripheral edge of said insulating sealing disk to form a cell shoulder along the line of crimp, the improvement comprising:

the end seal assembly comprising an insulating sealing disk comprising an integral central boss, wherein a portion of said boss protrudes from the housing open end, an elongated current collector penetrating through said boss, wherein a portion of said current collector protrudes from said boss and forms said negative terminal, wherein at least a portion of said insulating sealing disk lies within said cell housing, wherein the raised central boss has a width which is at least about 60% the diameter of the cell housing.

28. The electrochemical cell of claim 27 wherein said boss has a diameter between about 70% and 90% the inside diameter of the cell housing.

29. The electrochemical cell of claim 27 wherein said alkaline cell housing has a diameter between about 7 and 9 millimeters.

30. The electrochemical cell of claim 27 wherein said cell housing is an AAAA (LR61) size having an outside diameter of between about 7.7 and 8.3 millimeters.

31. The electrochemical cell of claim 27 wherein said cylindrical cell housing is an AA-AA (LR61) size and wherein said end seal assembly does not include a metal disk within any portion of said cell housing at the open end thereof.

32. The electrochemical cell of claim 27 wherein said cell does not include an end cap in electrical communication with said current collector.

33. The electrochemical cell of claim 27 wherein said cell does not include an insulating washer seated over said crimped edge of the cell housing.

34. The electrochemical cell of claim 27 wherein the insulating sealing disk comprises nylon 66.

35. The electrochemical cell of claim 27 wherein the insulating sealing disk comprises nylon 612.

36. The electrochemical cell of claim 27 wherein the insulating sealing disk has an overall thickness of between about 3 and 5 mm.

37. The electrochemical cell of claim 27 wherein the insulating sealing disk has an integral rupturable membrane having a thickness of between about 0.03 and 0.2 mm.

38. The electrochemical cell of claim 27 wherein said housing has a circumferential indent in its surface and a portion of the peripheral edge of said insulating disk rests on said indent.

* * * * *